Patented Feb. 20, 1934

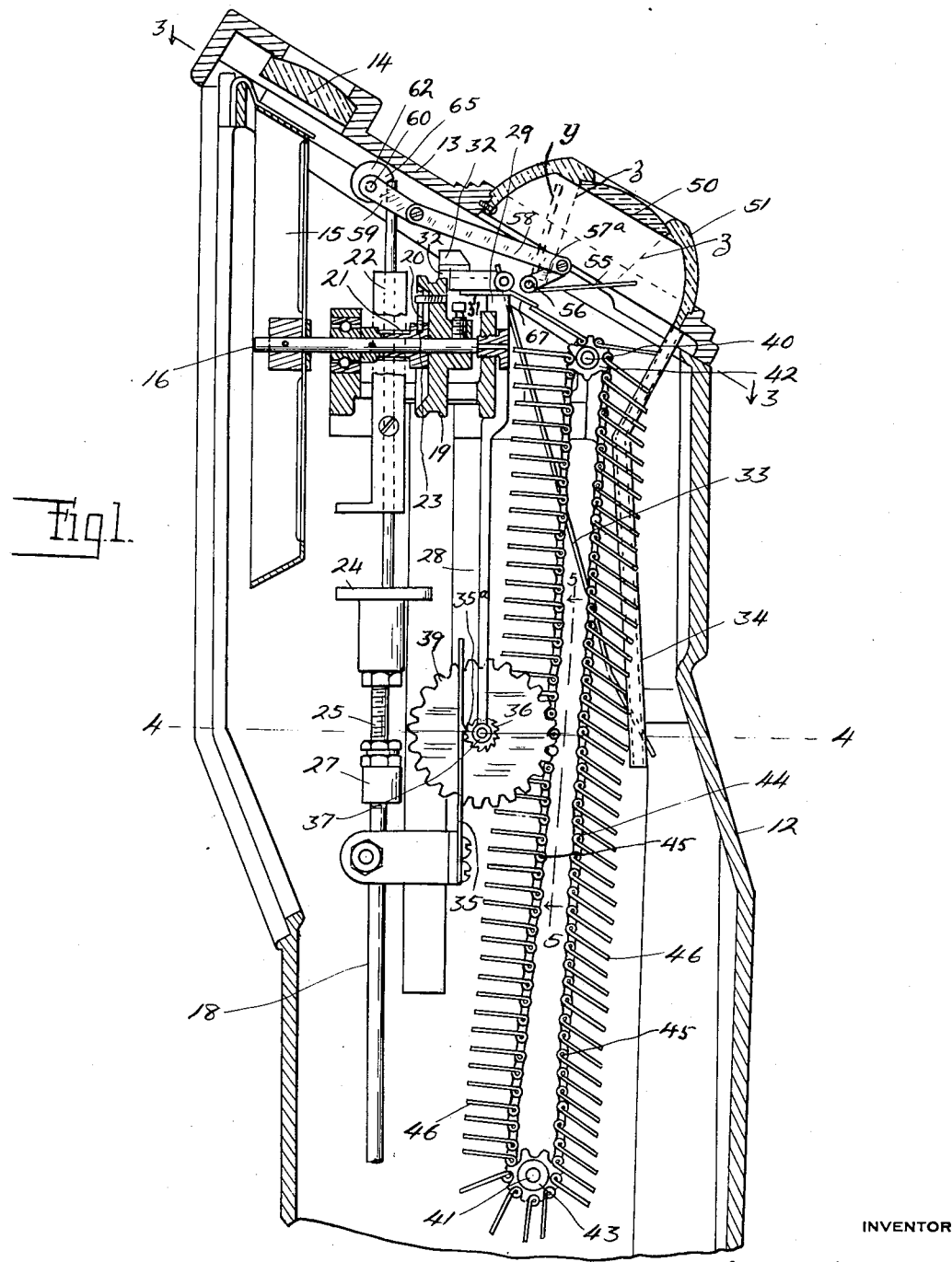

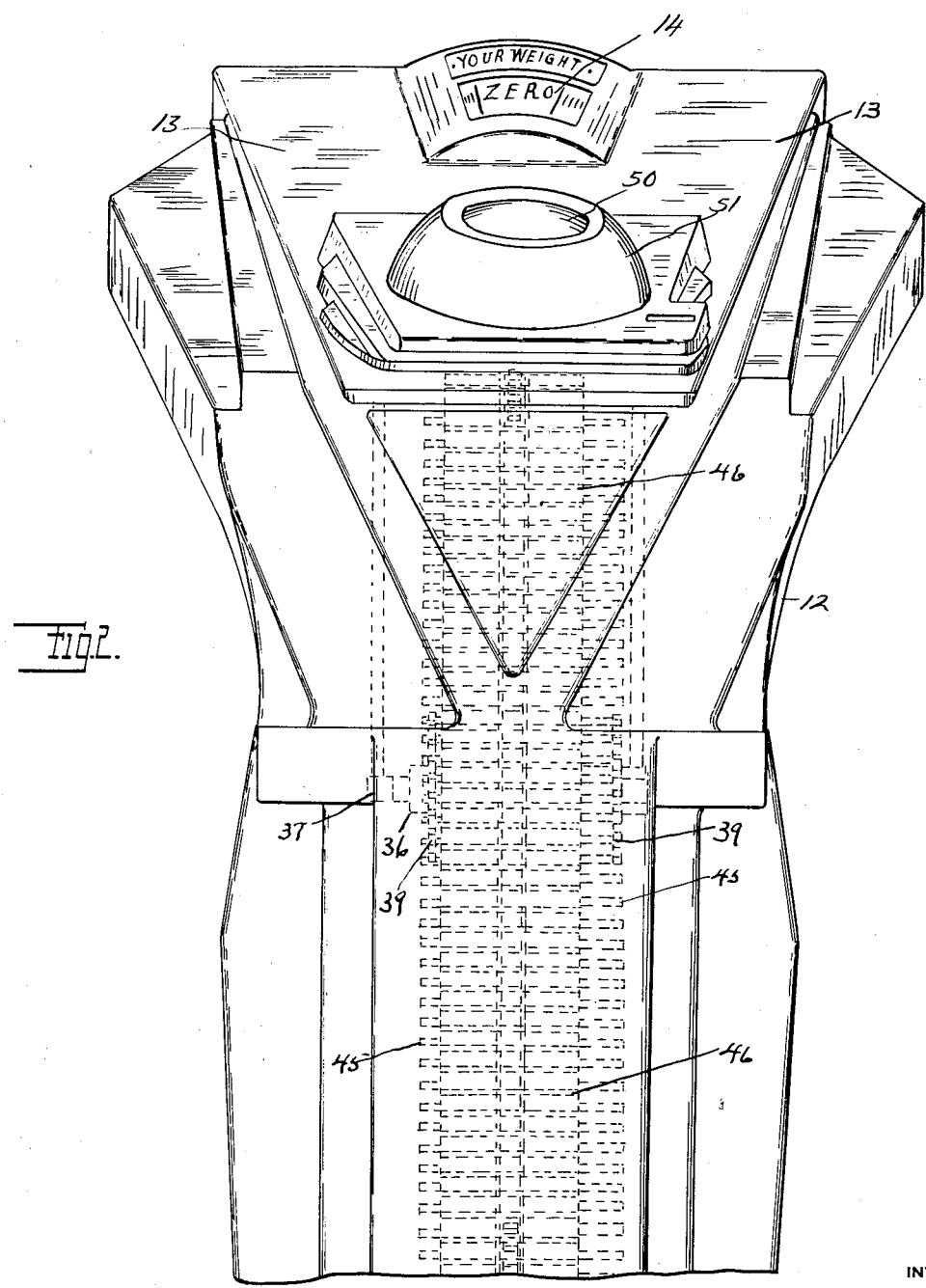

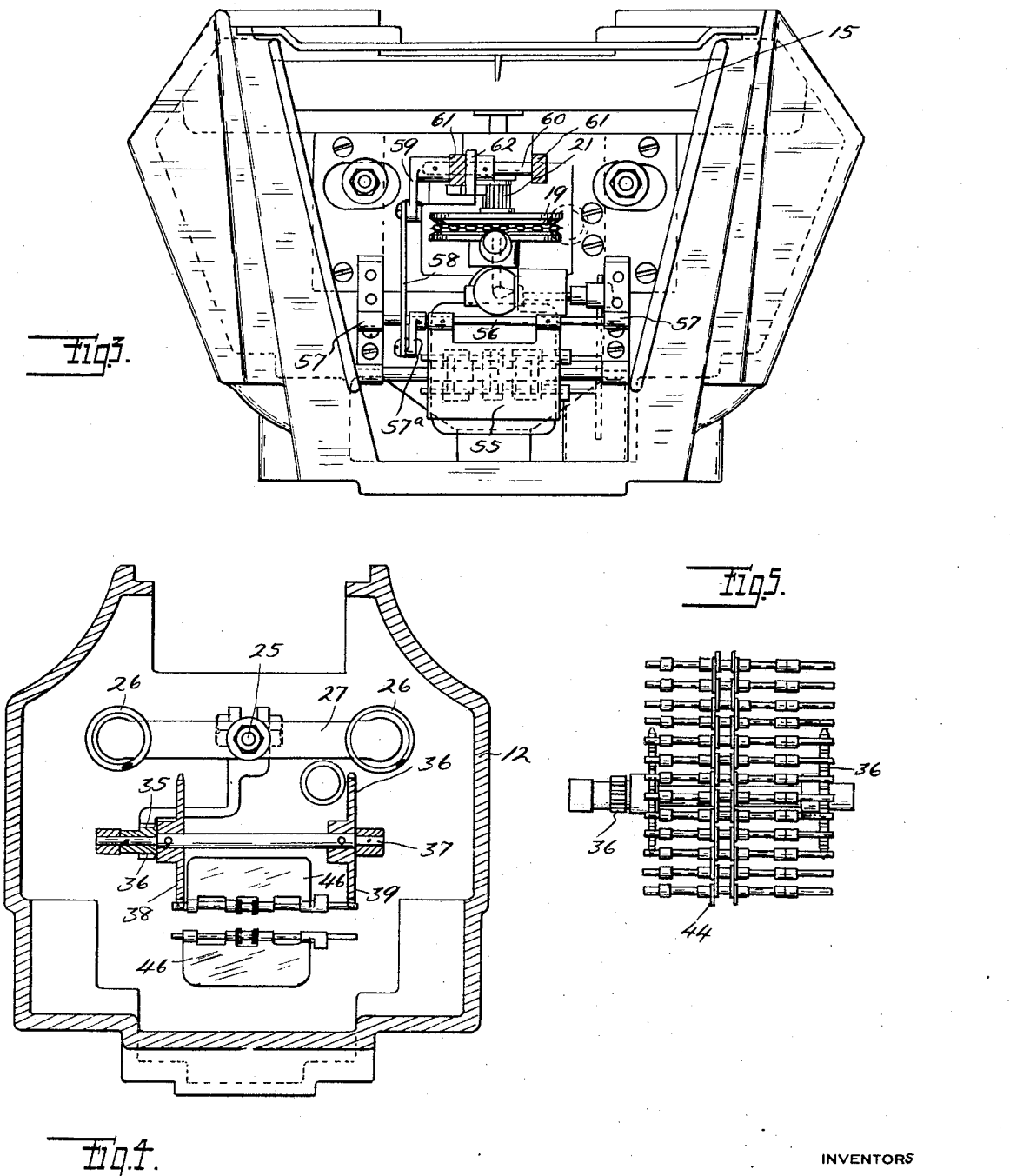

1,947,814

UNITED STATES PATENT OFFICE 1,947,814

DISPLAY MECHANISM

Hughes C. Turner and Howard Roy Stacks, Detroit, Mich.; said Stacks assignor to said Turner Application December 24, 1931. Serial No. 582,921

10 Claims. (Cl. 40—28)

This invention relates to mechanism for combining with a personal weighing scale the successive displaying of cards or tickets used for some such purpose as assuming to tell one's fortune, or displaying a message of any nature, and has for its object the provision of mechanism workable conjointly with some form of penny-in-the-slot scale such as are now so generally distributed in retail stores, in building lobbies and similar public places, while avoiding the consequence of actually passing out to the user the cards which bear messages or displays. By this means we are enabled to secure the same or equivalent results, as regards the interest of the patronizing public, without actual distribution of the cards, a large proportion of which are generally thrown away as soon as the message imprinted thereon has been read. We thus secure economy of results as regards any necessity of renewing the supply of cards; and any patron would have to operate the apparatus so many times before any duplication of the card displayed to him would take place, that the likelihood of such a thing occurring is very remote.

Another question or problem with which we believe we have successfully dealt in the organization of parts here offered has to do with the adequate actuation with some such element as an endless belt upon which the fortune telling cards are spacedly supported, without impairment of the accuracy of the weight reading offered by the scale when the patron has stepped upon the platform and released the weighing parts for action by the deposit of a coin.

Our preferred form of apparatus for effecting this desired end is shown in the accompanying drawings, wherein Figure 1 is a side elevational view of our apparatus largely in section, bringing out the relation of the weighing mechanism parts and of the display actuating parts.

Figure 2 is a front elevational view with parts of the outer shell broken away to indicate the position of some of the parts of the mechanism employed.

Figure 3 is a plan view from above, partly in section, and with the shell removed, being taken generally along the line 3—3 of Figure 1.

Figure 4 is a section taken through the line 4—4 of Figure 1, designed to bring out the relation of the ticket driving shaft to the other elements.

Figure 5 is a fragmentary elevational view of a part of the endless belt whereon the display cards are spacedly positioned.

The enclosing shell 12 is of any suitable contour, that herein illustrated representing a quite frequently encountered form, having positioned in its sloping cover 13 a magnifying glass 14, through which figures on the bevelled periphery of the rotatable dial 15 may be read. This dial, which is supported on one end of the shaft 16, is adapted to be rotatably actuated proportionately to the weight of the several users which exerts a downward draw upon the steelyard rod 18, whose lower end is connected with the standing platform of the scale (not shown). Our invention is supplementary to these admittedly known and now used parts, though to be operatively connected therewith.

On the shaft 16 is also mounted a balance wheel 19, provided with a driving pin 20. On the shaft 16 is also loosely mounted a gear pinion 21 driven by a rack 22, said pinion having a driving pin 23 which is adapted under certain operative conditions to engage the driving pin 20. The rack 22 may be looked upon as operatively being a continuation of the steelyard rod 18, and its lower end engages the braking plate 24 which is mounted on the upper end of the threaded part 25 of the steelyard rod 18 and is connected to weighing springs through the plate 27. All of these parts are supported by the bracket 28 which projects conveniently from the scale shell 12. At 31 is shown an extension of the bracket 29, on which is pivotally mounted the dial stop 32 which is balanced by a coin-controlled rod 33, whose lower end projects through the coin chute 34. The descent of a coin through this chute trips the control rod 33, whose movement lifts the dial stop 32, permitting the pinion 21 to drive, through the pins 23 and 20, to the balance wheel 19, allowing the rack 22 to drop on the braking plate 24 and follow the steelyard rod 25 to its proper position, according to the weight imposed on the scale platform. Unless and until these parts have thus been coin-actuated, the dial or weight-indicating mechanism, which in general follows lines now well known, cannot be actuated, though the ticket display mechanism which forms the particular subject matter of this disclosure, can be actuated though it cannot be seen because a blinding shutter, which will be described in detail later on, has not yet been actuated; and consequently anyone attempting to unauthorizedly and unpayingly use the device is balked.

Mounted on the steelyard rod 18 is a ratchet bracket 35, to which is attached a ratchet tooth 35$^a$ adapted to successively engage the teeth of the ratchet wheel 36, which is mounted on the rotatable shaft 37, the ends of which are journaled in the bracket 28. Near either end of the shaft are secured driving sprockets 38 and 39, which will be referred to in further detail later on.

Rotatably supported near the top and toward the bottom of the frame 12 are a pair of shafts 40 and 41, each provided with guide sprockets as 42 and 43, and over these sprockets pass the endless chain or belt 44 in a generally vertical plane, between the strictly weighing machine parts already described and the front wall of the enclosing shell, though, as brought out in Figure 3 particularly, well clear of the coin-tripped lever 33 already mentioned. At suitable distances along the endless belt or chain, preferably appurtenant each link thereof, are display ticket holders 46 which are free to rock somewhat about their pivot rods 45 as they pass about the guide sprockets 42 and 43. Each display piece is adapted to be exposed in suitable angular relation for observation through the magnifying glass 50, which is supported in the domed contouring 51 of the shell 12, and which is so positioned relatively to the weight-reading lens 14 and to the proper position of the customer as he stands upon the scale platform as to be easily readable. The sides of this domed piece are preferably of frosted glass, so that while they thus admit sufficient rays of light to materially facilitate the reading of the printed fortune or prophecy on the display cards through the lens 50 they will not permit unpaid-for looks at the cards from an angular position.

The two driving sprockets 38 and 39, it will be noted from an examination of Figure 4 particularly, are positioned on their supporting shaft 37 at either end of the display cards 46 as they move successively upward, the actuation therefor being furnished by the engagement of the driving sprockets 38 and 39 with the ends of the several small shafts or sprocket pins 45 whereon the inner pivotally supported edges of the display ticket holders 46 are mounted; thus each time the small ratchet wheel 36 is actuated by the weight-induced downward movement of the steelyard rod 18 the endless chain whereon the display ticket holders are mounted is advanced two spaces or numbers; it will be noted that the number of teeth on the small ratchet wheel 36 as compared with the chain-engaging sprocket wheels 38 and 39 is approximately that of one to two. Thus in case, as is preferable, there being an uneven number of links in the endless chain and a corresponding uneven number of display cards supported by it, the actuation of the chain in the manner described will result in the successive exposure of display card supports numbers 1, 3 and 5 to the temporary omission of numbers 2, 4, 6 etc. Assuming that there were 101 such display ticket holders, it would thus be necessary that the endless chain complete two entire circuits through the path determined by the positioning of its supporting sprocket wheels before all of the display ticket cards have been exposed to view. It would therefore be exceedingly unlikely that any one patron, no matter how frequent his patronage of the device might be, would encounter the same displayed message twice.

Since the curiosity of some would-be patrons, unwilling to spend the penny required for the actuation of the weighing mechanism, might in some cases be satisfied merely by a view of the message displayed by that one of the ticket holders for which the last preceding patron had paid, we provide thereagainst by pivotally supporting in the dotted path z of visibility through the lens 50 a blinder or shutter 55, mounted on the shaft 56, whose ends are journaled in the frame at 57. Operatively connected with one end of this shaft 56 is a lever 57$^a$ with whose end is pivotally connected a link 58, the other end of which is in turn connected with the lever 59 carried on the cam shaft 60 whose ends are mounted in suitable bearings 61 in the shell 12. Secured to this cam shaft 60 is the cam 62 which is positioned directly over the top of the steelyard rod 18. Unless and until a coin is dropped through the slot, thus tripping the lever 33, the gear pinion 21 cannot act. When, however, the coin-tripped lever has thus been actuated, not only are the strictly weighing machine parts actuated in a manner not necessary to here deal with further, but as well the cam shaft 60 is rotated, due to the fact that the descent of the rod 18 permits the overweighted head 65 of the cam to act, rotating the shaft and consequently swinging the lever 59 rearwardly (to the left, in the position shown in Figure 1), thus rearwardly drawing the link 58 and swinging the lever 57$^a$ rearwardly, because of the common connection of this latter and of the shutter 55 to the supporting shaft 60. This described movement of the parts results in the upward throw of the shutter 55 to approximately the position indicated by the dotted line $y$ in said Figure 1, out of interfering position with a clear view of the then displayed card upon the endless belt through the lens 50. As soon as the customer steps off the scale, the resultant return of the strictly weighing parts of the mechanism to unactuated position, including the rise of the steelyard rod 18 to position of upward holding of the overweighted cam 60, results in the general forward movement of the link and lever members just described, and the consequent throw of the shutter to the vision-interfering position shown in full lines in Figure 1.

Since even with the best of care in assembling of the display ticket holders upon their respective pins in the endless sprocket, there is bound to be a certain degree of variance in the exact angularity assumed by the successive ticket holders as they are brought to positions of visibility through the lens 50, we preferably provide a spring 67 to yieldably position each card in the desired angular position of maximum readability relatively to the lens 50.

The actuative pressure required for the operation of the parts here explained is so slight as regards its dependence upon the strictly weighing-mechanism parts that, thanks to the particular connections employed, no impairment of the accurate weight-registration shown by the exposure of figures on the periphery of the disc 15 results.

What we claim is:

1. In a card display mechanism, in combination with an endless chain, a plurality of display cards hingedly connected thereto in spaced relation to one another, means operatively engageable with said chain whereby it and its supported series of cards are moved a predetermined distance past a selected observation point, means operatively connecting said last mentioned means with the movable parts of a scale, whereby the weight-actuating operation thereof and of the chain-advancing means is contemporaneously effected, coin-operated means whereby the unauthorized operation of the entire mechanism is controlled, and a pivoted shutter operatively connected with certain of said recited parts whereby a view of the otherwise exposed dislay cards is made contingent upon the orderly operation of the mechanism.

2. In a card-display mechanism, the combination, with weight-actuated scale elements, of an endless chain supported in position of potential limited actuation, display cards carried thereby in spaced relation to one another, means operatively connecting said endless chain and said scale elements whereby the former is actuated to a predetermined degree upon each authorized actuation of the scale, coin-operable means operatively connected with the weight-transmitting element of the scale whereby unauthorized use thereof is prevented, means normally obstructive of the visibility of certain of the chain-carried display cards as they severally attain a predetermined position relatively to the other parts of the mechanism, and means adapted to be released by the weight-actuated movement of the scale steelyard whereby said last-mentioned means is temporarily swung to non-obstructive position.

3. A card displaying appurtenance to a coin-controlled mechanism, comprising rotatable gear members operatively connected therewith, an endless chain provided with pivotally attached and spacedly located display cards, rotatably journaled gear wheels over which said endless chain is movably drawn, the elements of said chain being adapted to be actuated through a predetermined distance by each transmitted movement of said gear members, a pivotally supported shutter member normally positioned in interfering relation to the otherwise possible visibility of the display cards as they successively reach a predetermined position in the path of movement of their supporting chain, and means operatively connecting said shutter with the coin-controlled weighing elements of the mechanism whereby upon the orderly release of the latter the shutter is temporarily swung to position of noninterference with the intended reading of that one of the cards then in displayed position.

4. In combination with a superiorly apertured shell, an endless chain supported therewithin in position for its component parts to subjacently and successively pass the aperture in said shell, display cards supported by said chain and accordingly adapted to be successively positioned for reading of their imprinted contents through the aperture in said shell, a shutter journaled within said shell in normal position of interference with the readability of said display cards through said aperture, a weighing mechanism positioned within said shell, means operatively connecting said weighing mechanism with said endless chain whereby a movement of the latter adequate to effect a predetermined degree of travel thereof is made dependent upon the proper actuation of the former, and means also operatively connected with certain elements of the weighing mechanism whereby said shutter is swung to position of non-interference with the reading of the display card then positioned opposite said shell aperture in timed relation to the actuation of the weighing mechanism.

5. In combination with a shell provided with selectively located inspection apertures, an endless belt bearing a plurality of displayed message portions carried by spaced surface portions thereof, supporting guide members over which said endless belt is adapted to travel, past one of said inspection apertures, and means adjacent said inspection aperture for detaining and positioning such display message sections as they successively pass the vicinity of said inspection aperture, a weighing mechanism located within said shell and with which said endless belt mechanism is operatively connected, and an obscuring shutter lying normally in the path of visibility of the displayed message sections of the endless belt, and means operatively connecting said obscuring shutter and a selected portion of said weighing mechanism whereby said shutter is thrown to a position of non-interference with the reading of the then displayed message on said endless belt contemporaneously with the load-operated activity of said weighing mechanism.

6. The combination, with an enclosing shell provided with selectively located inspection apertures, of a load-operable weighing mechanism whose reading is adapted to be observed through one of the apertures in said shell, an endless belt positioned within said shell in position for successive display portions thereof to be actuated into position of readability through the other one of the apertures in said shell, means operatively connecting said endless belt and said weighing mechanism whereby the former is actuated to a predetermined degree at each load-induced activation of the latter, a guide member over which said endless belt passes located near the second-named one of said inspection apertures, a shutter member positioned in normal position of obscuration of the displayed endless belt section adjacent said second named inspection aperture, and means operatively connecting said shutter and said weighing mechanism whereby upon each orderly activation of the latter said shutter is temporarily swung to non-obscuring position relatively to said endless belt.

7. Means for displaying in desired sequence placards of reduced size, comprising a magnifying lens, an endless flexible supporting member positioned to pass subjacently thereof, a plurality of cards secured thereto and adapted to be successively conveyed thereby to a position enabling easy reading of the same therethrough, means for moving the endless flexible member to bring the cards to such position, a locating member engaging each card when so positioned beneath the lens, to hold the same in desired position, and a weight-responsive scale mechanism with which said supporting member is operatively connected for successive synchronous actuations in direct response to the weight-induced activation of said scale mechanism.

8. In combination with a coin-controlled weighing scale, means for displaying various items of successive reading matter to users of the scale upon each actuation thereof, comprising a magnifying lens observable from a position above the scale, an endless flexible card-supporting member adapted to pass subjacently of said magnifying lens, a plurality of cards secured thereto and adapted to be conveyed thereby to a point beneath the lens at which their inscriptions may be easily read therethrough, means for moving the endless supporting and conveying member a desired distance upon each actuation of the scale to successively bring desired cards into viewable position behind the lens, and a screen plate actuatable in response to operation of the coin-controlled weighing mechanism, adapted normally to shield from view the card behind the lens, and to be moved from such obstructing position upon coin-released actuation of the scale.

9. In combination with a coin-controlled weighing scale having a housing with an aperture in the top portion thereof, means for displaying desired items of reading matter to successive users of the scale upon each actuation thereof, comprising a magnifying lens mounted in the aperture in the housing and observable from a position thereabove, an endless flexible card-supporting member within the housing subjacently of said magnifying lens, a plurality of cards secured thereto and adapted to be conveyed thereby to a point substantially beneath the focal point of the lens and within the housing at a point which inscriptions carried by the cards may easily be read through the lens, means responsive to actuation of the scale for moving the conveyor a desired distance upon each actuation thereof to bring a card into viewable position behind the lens, a screening plate hingedly supported beneath said lens and normally obstructing vision therethrough but movable in response to coin-released operation of the weighing mechanism to permit observation through the lens of the subjacent card.

10. In combination with a coin-controlled weighing scale, a scale housing having an aperture in its top wall, means for displaying desired items of reading matter to successive users of the scale, and for changing such reading matter upon each actuation of the scale, comprising a magnifying lens mounted in the aperture in the housing and observable from above the scale, a pair of endless link belt conveyor members mounted and arranged to travel in substantial alignment within the housing subjacently of said magnifying lens, a plurality of card-supporting members trunnioned in the link belts, means responsive to actuation of the scale to move the conveyor a desired distance upon each actuation thereof, to bring a new card into viewable position beneath the lens, a shield plate hingedly supported subjacently of said lens and normally obstructing vision therethrough, and means for moving the shield plate from such obstructing position upon coin-released actuation of the scale, to permit observation through the lens of the subjacent card.

HUGHES C. TURNER.
HOWARD ROY STACKS.